(12) United States Patent
Ofelt et al.

(10) Patent No.: US 8,582,440 B2
(45) Date of Patent: Nov. 12, 2013

(54) OVERSUBSCRIBED PACKET STREAM-BASED INTERCONNECT PROTOCOL

(75) Inventors: David J. Ofelt, Los Gatos, CA (US); Jean-Marc Frailong, Los Altos, CA (US); Wing Leong Poon, Sunnyvale, CA (US); Aibing Zhou, San Jose, CA (US); Xianzhi Li, Santa Clara, CA (US); Hongsheng Ping, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 593 days.

(21) Appl. No.: 12/700,850

(22) Filed: Feb. 5, 2010

(65) Prior Publication Data

US 2011/0194409 A1  Aug. 11, 2011

(51) Int. Cl.
*H04W 28/10* (2009.01)

(52) U.S. Cl.
USPC ......... 370/236; 370/230.1; 370/231; 370/235

(58) Field of Classification Search
USPC .............. 370/229, 230, 230.1, 231, 235, 236
See application file for complete search history.

(56) References Cited

U.S. PATENT DOCUMENTS

| | | | |
|---|---|---|---|
| 6,442,164 B1 * | 8/2002 | Wu | 370/395.21 |
| 2004/0184447 A1 * | 9/2004 | Nadell et al. | 370/360 |

OTHER PUBLICATIONS

"System Packet Interface," Wikipedia, printed on Apr. 15, 2013, pp. 1-3. http://en.wikipedia.org/wiki/System_Packet_Interface.
"Interlaken (networking)," Wikipedia, printed on Apr. 15, 2013, p. 1. http://en.wikipedia.org/wiki/Interlaken_(networking).

* cited by examiner

*Primary Examiner* — Un C Cho
*Assistant Examiner* — Siming Liu
(74) *Attorney, Agent, or Firm* — Harrity & Harrity, LLP

(57) ABSTRACT

A network device includes a receiver component that generates flow control information. The network device also includes a transmitter component that receives a packet for forwarding to the receiver component, receives flow control data for the packet from the receiver component, and provides the packet and the flow control data for the packet to a fabric component. The fabric component performs a congestion management operation for the packet, and forwards the packet to the receiver component based on the flow control data and results of the congestion management operation.

20 Claims, 12 Drawing Sheets

OVERSUBSCRIBED PACKET STREAM-BASED INTERCONNECT PROTOCOL

BACKGROUND

There are a number of packet stream-based chip-to-chip interconnect protocols in the network industry. Some protocols are defined on fixed bandwidth point-to-point connections between chips (e.g., of a network device, such as a router). However, if a network device includes a chip (e.g., a packet processing chip, such as a packet forwarding engine (PFE)) with a single interface, and more than one interface device (e.g., input/output cards (IOCs)) needs to communicate with the packet processing chip, an interposer device (e.g., that acts as a switch) may be provided between the packet processing chip and the interface devices. If the interface devices produce more bandwidth than the packet processing chip can handle, current protocols do not prevent the interface devices from oversubscribing the packet processing chip.

SUMMARY

According to one aspect, a method may implemented by a network device. The method may include receiving, by a transmitter component of the network device, a packet for forwarding to a receiver component of the network device; receiving, by the transmitter component and from the receiver component, flow control data for the packet; providing, by the transmitter component, the packet and the flow control data to a fabric component of the network device; performing, by the fabric component, a congestion management operation for the packet; and forwarding, by the fabric component, the packet to the receiver component based on the flow control data and results of the congestion management operation.

According to another aspect, a network device may include a receiver component to generate flow control information. The network device may also include a transmitter component to receive a packet for forwarding to the receiver component, receive flow control data for the packet from the receiver component, where the flow control data includes information for controlling a flow of the packet from the transmitter component to the receiver component, and provide the packet and the flow control data for the packet to a fabric component. The fabric component may perform a congestion management operation for the packet, and may forward the packet to the receiver component based on the flow control data and results of the congestion management operation.

According to still another aspect, one or more computer-readable memory devices may store instructions executable by one or more processors. The one or more computer-readable memory devices may include one or more instructions for implementing a protocol to cause a transmitter component of a network device to receive a packet for forwarding to a receiver component of the network device, receive, from the receiver component, flow control data for the packet, and provide the packet and the flow control data to a fabric component of the network device. The one or more computer-readable memory devices may also include one or more instructions for implementing the protocol to cause the fabric component to perform a congestion management operation for the packet, and forward the packet to the receiver component based on the flow control data and results of the congestion management operation.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

Implementations described herein may provide systems and/or methods that enable, via a stream-based packet protocol (e.g., a universal packet over high speed link 2 (HSL2) (UPOH) protocol, also known as a "wide area network (WAN) over Fabric" protocol), point-to-point connections as well as oversubscribed configurations using a generic cell-based fabric. The systems and/or methods may transfer packets between two devices or components (e.g., a receiver component and transmitter component provided in a network device) on multiple interleaved streams. The systems and/or methods may provide flow control on each stream so that the receiver component may limit a rate at which the transmitter component may send packets. The systems and/or methods may provide cell-based data transfer between the transmitter and receiver components to allow for use of a generic cell-based fabric component (i.e., a protocol-specific component is not required).

Furthermore, the systems and/or methods may allocate bandwidth between endpoints (e.g., multiple transmitter components) that want to communicate with a same target component (e.g., the receiver component). The bandwidth allocation may handle static point-to-point data transfers, dynamic multipoint-to-point (e.g., with congestion management) data transfers, and dynamic point-to-multipoint (e.g., with congestion management) data transfers. The systems and/or methods may also be tolerant of dropped cells by allowing the receiver component to detect and recover from lost cells containing packet data.

The term "packet," as used herein, is intended to be broadly construed to include a frame, a datagram, or a packet; a fragment of a frame, a fragment of a datagram, or a fragment of a packet; or another type, arrangement, or packaging of data. The term "cell," as used herein, is intended to be broadly construed to include a fragment of a frame, a fragment of a datagram, or a fragment of a packet.

The term "component," as used herein, is intended to be broadly construed to include hardware (e.g., a processor, a microprocessor, an application-specific integrated circuit (ASIC), field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Exemplary Network

Figure 1:
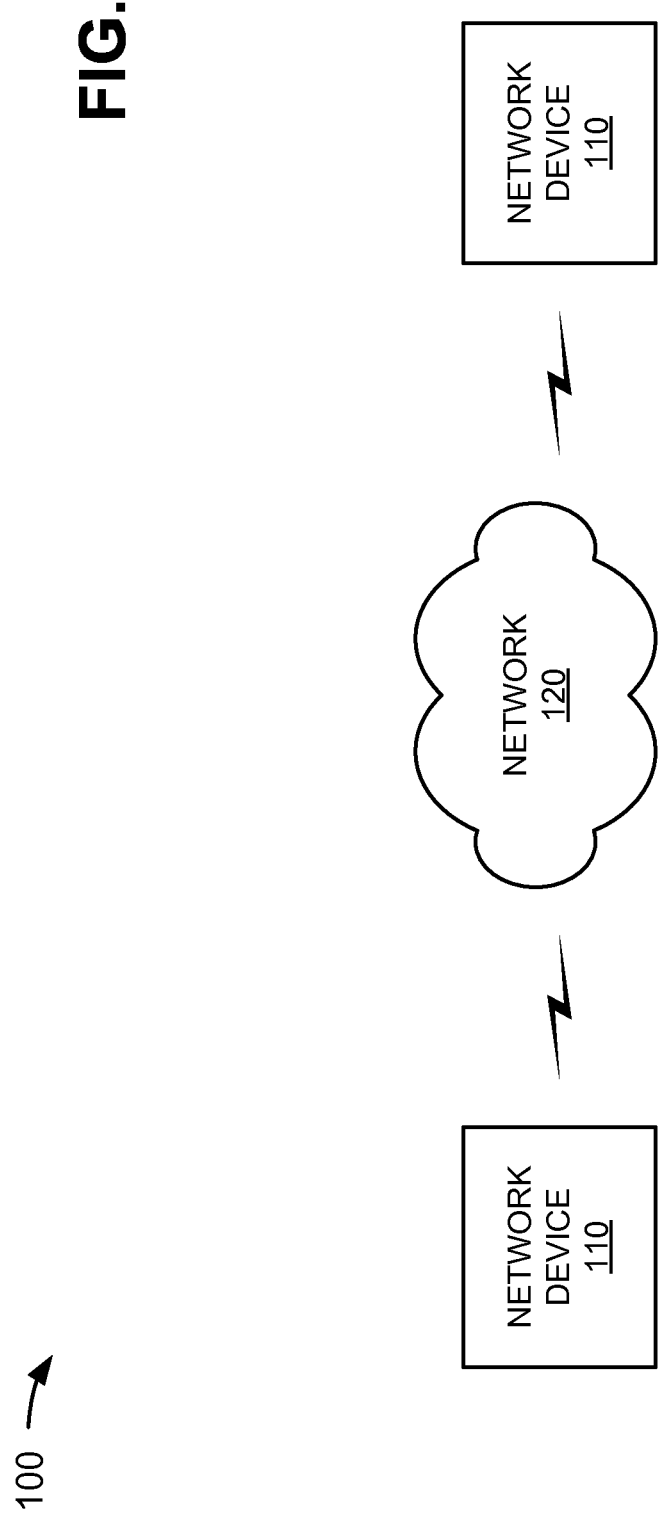
FIG. 1 is a diagram of an exemplary network in which systems and/or methods described herein may be implemented.

FIG. 1 is a diagram of an exemplary network in which systems and/or methods described herein may be implemented. As illustrated, network 100 may include one or more network devices 110 interconnected by a network 120. Components of network 100 may interconnect via wired and/or wireless connections or links. Two network devices 110 and a single network 120 have been illustrated in FIG. 1 for simplicity. In practice, there may be more network devices 110 and/or networks 120. Also, in some instances, one or more of the components of network 100 may perform one or more tasks described as being performed by another one or more of the components of network 100.

Network device 110 may include a data transfer device, such as a gateway, a router, a switch, a firewall, a network interface card (NIC), a hub, a bridge, a proxy server, an optical add-drop multiplexer (OADM), or some other type of device that processes and/or transfers traffic. In an exemplary implementation, network device 110 may include a device that is capable of transmitting information to and/or receiving information from other network devices 110 via network 120. In another exemplary implementation, network device 110 or one or more components of network device 110 may implement the UPOH protocol described herein.

Network 120 may include one or more networks of any type. For example, network 120 may include a local area network (LAN), a wide area network (WAN), a metropolitan area network (MAN), a telephone network (such as the Public Switched Telephone Network (PSTN), Public Land Mobile Network (PLMN), a wireless network), an intranet, the Internet, an optical fiber (or fiber optic)-based network, or a combination of networks.

Although FIG. 1 shows exemplary components of network 100, in other implementations, network 100 may contain fewer components, different components, differently arranged components, or additional components than depicted in FIG. 1.

Exemplary Network Device Configuration

Figure 2:
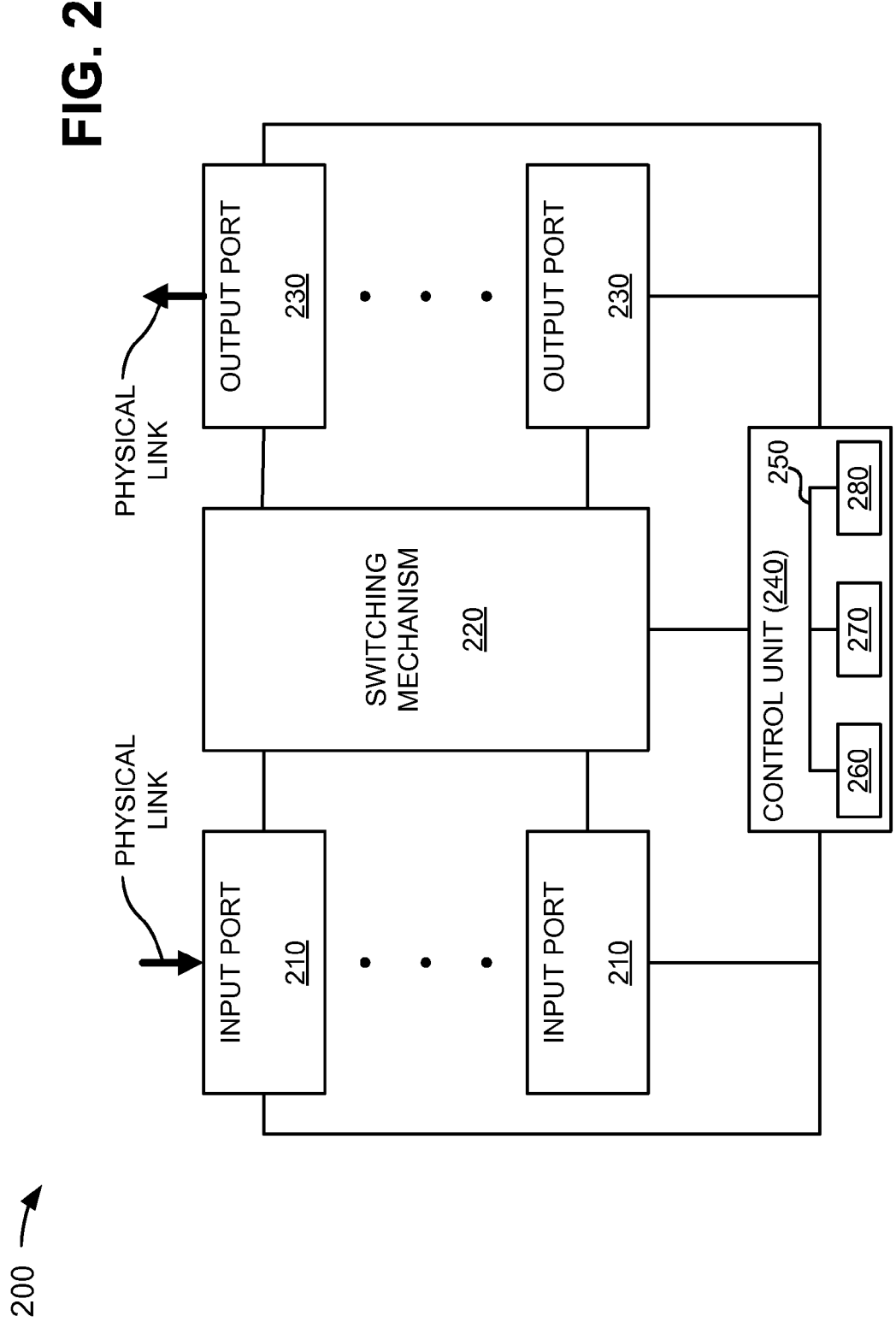
FIG. 2 is a diagram of exemplary components of a network device depicted in FIG. 1.

FIG. 2 illustrates a diagram of exemplary components of a device 200 that may correspond to one of network devices 110 depicted in FIG. 1. As shown, device 200 may include input ports 210, a switching mechanism 220, output ports 230, and a control unit 240.

Input ports 210 may be a point of attachment for a physical link and may be a point of entry for incoming traffic (e.g., packets). Input ports 210 may carry out data link layer encapsulation and decapsulation. Input ports 210 may look up a destination address of an incoming packet in a forwarding table to determine its destination port (i.e., route lookup). In exemplary implementations, input ports 210 may send (e.g., may be an exit point) and/or receive (e.g., may be an entry point) packets.

Switching mechanism 220 may interconnect input ports 210 with output ports 230. Switching mechanism 220 may be implemented using many different techniques. For example, switching mechanism 220 may be implemented via busses, crossbars, and/or shared memories.

Output ports 230 may store packets and may schedule packets for service on an output link (e.g., a physical link). Output ports 230 may include scheduling algorithms that support priorities and guarantees. Output ports 230 may support data link layer encapsulation and decapsulation, and/or a variety of higher-level protocols. In an exemplary implementation, output ports 230 may send packets (e.g., may be an exit point) and/or receive packets (e.g., may be an entry point).

Control unit 240 may use routing protocols and one or more forwarding tables for forwarding packets. Control unit 240 may interconnect with input ports 210, switching mechanism 220, and output ports 230. Control unit 240 may compute a forwarding table, implement routing protocols, and/or run software to configure and manage device 200. Control unit 240 may handle any packet whose destination address may not be found in the forwarding table.

In an exemplary implementation, control unit 240 may include a bus 250 that may include a path that permits communication among a processor 260, a memory 270, and a communication interface 280. Processor 260 may include one or more processors, microprocessors, ASICs, FPGAs, or other types of processing units that may interpret and execute instructions. Memory 270 may include a RAM, a ROM device, a magnetic and/or optical recording medium and its corresponding drive, and/or another type of static and/or dynamic storage device that may store information and instructions for execution by processor 260. Communication interface 280 may include any transceiver-like mechanism that enables control unit 240 to communicate with other devices and/or systems.

Device 200 may perform certain operations, as described in detail below. Device 200 may perform these operations in response to processor 260 executing software instructions contained in a computer-readable medium, such as memory 270. A computer-readable medium may be defined as a physical or logical memory device. A logical memory device may include memory space within a single physical memory device or spread across multiple physical memory devices. The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes described herein. Thus, implementations described herein are not limited to any specific combination of hardware circuitry and software.

In an exemplary implementation, the software instructions contained in memory 270 may cause processor 260 to utilize the UPOH protocol described herein. In another exemplary implementation, one or more components of device 200 may include their own processors and memories, and software instructions contained in the component memories may cause the component processors to utilize the UPOH protocol described herein.

Although FIG. 2 shows exemplary components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

Figure 3:
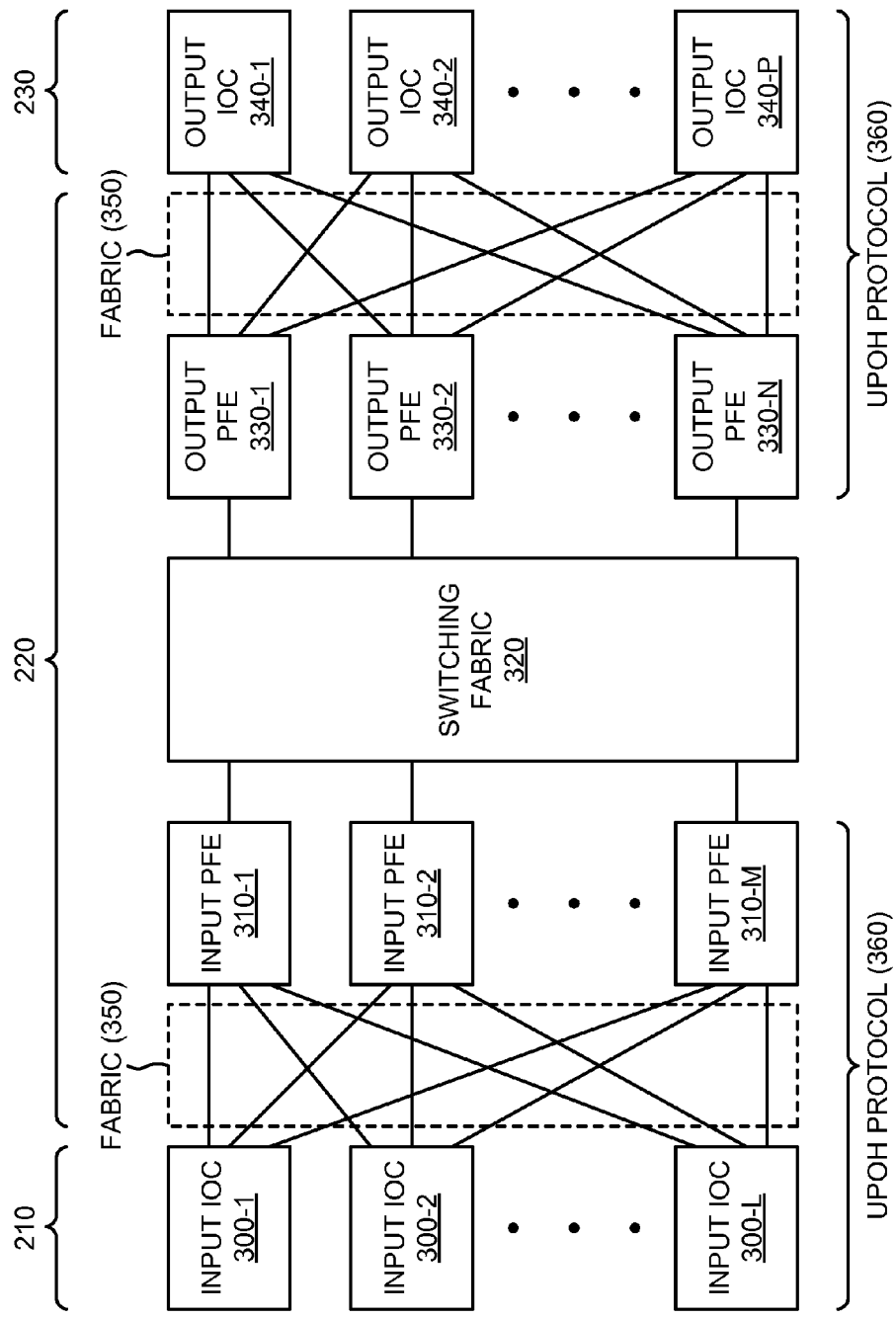
FIG. 3 is a diagram of further exemplary components of the network device.

FIG. 3 is a diagram of further exemplary components of network device 110. As illustrated, network device 110 may include a group of input IOCs 300-1 through 300-L (collectively referred to as "input IOCs 300" and, in some instances, singularly as "input IOC 300"); a group of input PFEs 310-1 through 310-M (collectively referred to as "input PFEs 310" and, in some instances, singularly as "input PFE 310"); a switching fabric 320, a group of output PFEs 330-1 through 330-N (collectively referred to as "output PFEs 330" and, in some instances, singularly as "output PFE 330"); a group of output IOCs 340-1 through 340-P (collectively referred to as "output IOCs 340" and, in some instances, singularly as "output IOC 340"); and fabrics 350.

In an exemplary implementation, there may be more input IOCs 300 than input PFEs 310, and there may be more output IOCs 340 than output PFEs 330. As further shown in FIG. 3, input IOCs 300 may correspond to input ports 210 (FIG. 2); input PFEs 310, output PFEs 330, and fabrics 350 may correspond to switching mechanism 220 (FIG. 2); and output IOCs 340 may correspond to output ports 230 (FIG. 2). As further shown in FIG. 3, a UPOH protocol 360 may be implemented by input IOCs 300, input PFEs 310, output PFEs 330, output IOCs, and/or fabrics 350.

Input IOC 300 may include an input/output card that may be a point of attachment for a physical link and may be a point of entry for incoming packets to network device 110. As shown in FIG. 3, each of input IOCs 300 may interconnect with multiple input PFEs 310 (e.g., point-to-multipoint connections), via fabric 350. Input IOC 300 may include a variety of physical interfaces for receiving packets provided to network device 110. For example, input IOC 300 may include one or more Ethernet interfaces with small form-factor pluggable (SFP) connectors, one or more Ethernet interfaces with RJ-45 connectors, one or more Ethernet interfaces with XFP (e.g., 10 Gigabit SFP) connectors, and/or other interfaces.

Input PFE 310 may include a component that may process incoming packets (e.g., received from input IOC 300) prior to transmitting the packets to another PFE (e.g., output PFE 330). Input PFE 310 may also perform route lookup for packets, using forwarding tables, to determine destination information. If the destination information indicates that the packets should be sent to another PFE (e.g., output PFE 330) via switching fabric 320, then input PFE 310 may prepare the packets for transmission to the other PFE, if necessary, and may send the packets to the other PFE, via switching fabric 320.

Switching fabric 320 may include a switching component that may allow efficient communication between input PFEs 310 and output PFEs 330. For example, switching fabric 320 may include a hardwired non-blocking minimal spanning switch capable of connecting Q inputs to Q outputs in any combination.

Output PFE 330 may include a component that may process packets (e.g., received from input PFE 310 via switching fabric 320) prior to transmitting the packets to a network (e.g., network 120). Output PFE 330 may also perform route lookup for packets, using forwarding tables, to determine destination information. If the destination information indicates that the packets should be sent out on a physical interface (e.g., one of output IOCs 340) connected to output PFE 330, then output PFE 330 may prepare the packets for transmission by, for example, adding any necessary headers, and may transmit the packets to one of output IOCs 340.

Fabric 350 may include a switching component that may allow efficient communication between input IOCs 300 and input PFEs 310 and between output PFEs 330 and output IOCs 340. For example, fabric 350 may include a hardwired non-blocking minimal spanning switch capable of connecting Z inputs to Z outputs in any combination. In one exemplary implementation, switching fabric 320 and fabrics 350 may correspond to the same physical fabric.

UPOH protocol 360 may include a universal packet protocol provided over HSL2 (e.g., a protocol that allows the physical layer to be changed independent of payload format of a packet). In an exemplary implementation, UPOH protocol 360 may be utilized by input IOCs 300, input PFEs 310, output IOCs 330, output PFEs 340, fabrics 350, and/or one or more components of input IOCs 300, input PFEs 310, output IOCs 330, output PFEs 340, and/or fabrics 350. Further details of UPOH protocol 360 are provided below.

Although FIG. 3 shows exemplary components of network device 110, in other implementations, network device 110 may contain fewer components, different components, differently arranged components, or additional components than depicted in FIG. 3. Alternatively, or additionally, one or more components of network device 110 may perform one or more other tasks described as being performed by one or more other components of network device 110.

Figure 4:
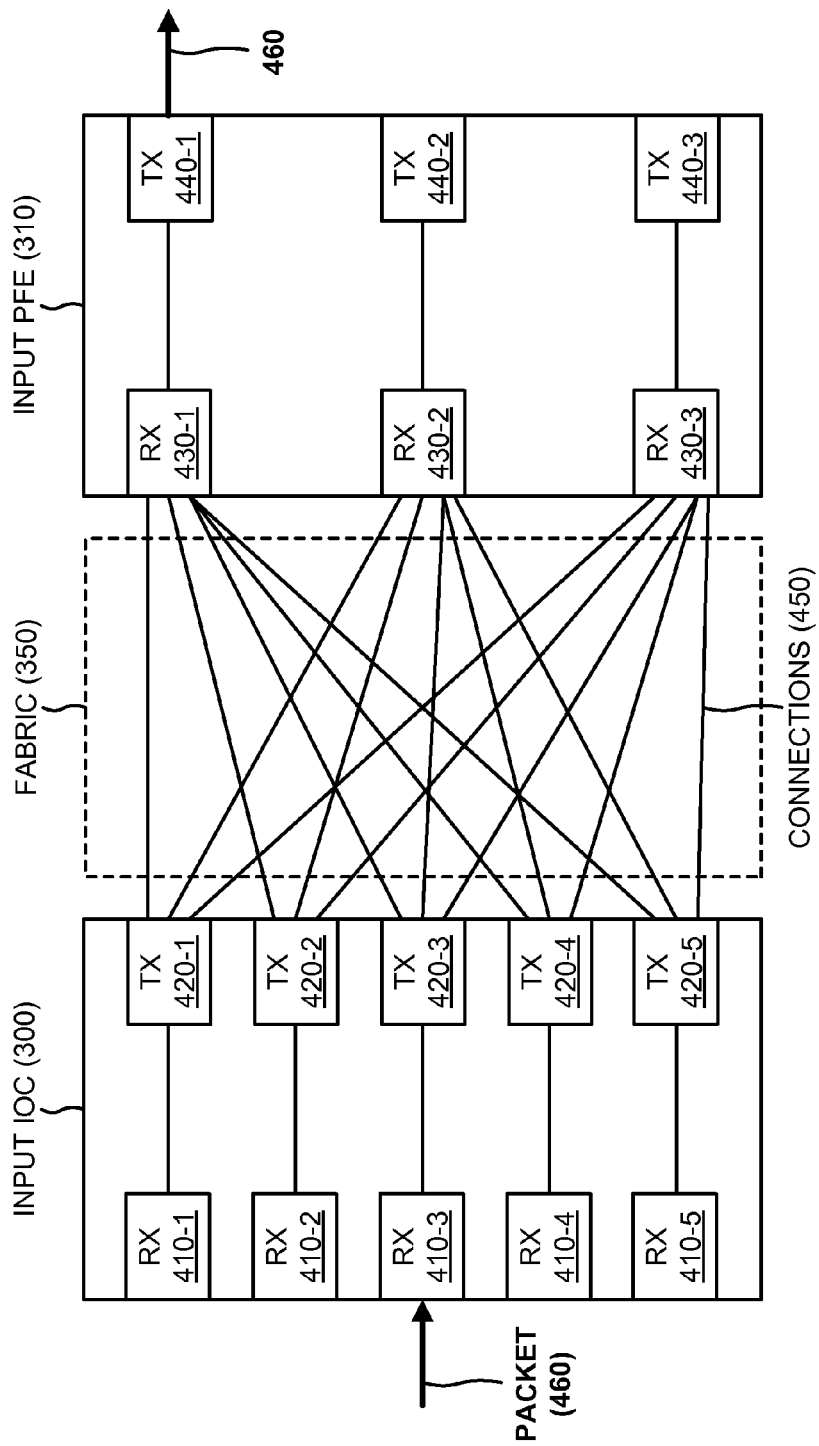
FIG. 4 is a diagram of exemplary interactions among components of an exemplary portion of the network device.

FIG. 4 is a diagram of exemplary interactions among components of an exemplary portion 400 of network device 110. As shown, exemplary portion 400 may include input IOC 300, input PFE 310, and fabric 350. Input IOC 300, input PFE 310, and fabric 350 may include the functionality described above in connection with, for example, FIG. 3.

As further shown in FIG. 4, input IOC 300 may include a group of receivers (RXs) 410-1 through RX 410-5 (collectively referred to as "RXs 410" and, in some instances, singularly as "RX 410") interconnected with a group of transmitters (TXs) 420-1 through 420-5 (collectively referred to as "TXs 420" and, in some instances, singularly as "TX 420"). Although FIG. 4 shows five RXs 410 and five TXs 420, in other implementations, input IOC 300 may include more or fewer RXs 410 and/or TXs 420.

RX 410 may be a point of attachment for a physical link and may be a point of entry for incoming packets. RX 410 may look up a destination address of an incoming packet in a forwarding table to determine its destination port (i.e., route lookup). In exemplary implementations, RX 410 may receive packets from a physical link attached to network device 110.

TX 420 may store packets and may schedule packets for delivery to output PFE 310. TX 420 may include scheduling algorithms that support priorities and guarantees. In an exemplary implementation, TX 420 may send packets (e.g., may be an exit point) to output PFE 310, via fabric 350.

Input PFE 310 may include a group of receivers (RXs) 430-1 through RX 430-3 (collectively referred to as "RXs 430" and, in some instances, singularly as "RX 430") interconnected with a group of transmitters (TXs) 440-1 through 440-3 (collectively referred to as "TXs 440" and, in some instances, singularly as "TX 440"). Although FIG. 4 shows three RXs 430 and three TXs 440, in other implementations, input PFE 310 may include more or fewer RXs 430 and/or TXs 440. In an exemplary implementation, input PFE 310 may include fewer RXs 430 than TXs 420 provided in input IOC 300, and a single RX 430 may interconnect with multiple TXs 420 (e.g., a multipoint-to-point connection).

RX 430 may be a point of entry for incoming packets. RX 430 may look up a destination address of an incoming packet in a forwarding table to determine its destination port (i.e., route lookup). In exemplary implementations, RX 430 may receive (e.g., may be an entry point) packets from TXs 420, via fabric 350.

TX 440 may store packets and may schedule packets for delivery to switching fabric 320 (not shown). TX 440 may include scheduling algorithms that support priorities and guarantees. In an exemplary implementation, TX 440 may send packets (e.g., may be an exit point) to output PFE 330, via switching fabric 320.

As further shown in FIG. 4, fabric 350 may provide connections 450 between TXs 420 of input IOC 300 and RXs 430 of input PFE 310. In one example, a packet 460 may be received by network device 110 at RX 410-3 (e.g., of input IOC 300) and may be provided to TX 420-3. Based on information contained in packet 460 (e.g., destination information) and UPOH protocol 360, TX 420-3 may forward packet 460 to one of RXs 430 of input PFE 310. As shown, TX 420-3 may forward packet 460 to RX 430-1 (e.g., via connection 450 provided between TX 420-3 and RX 430-1 in fabric 350). RX 430-1 may forward packet 460 to TX 440-1 and TX 440-1 may forward packet 460 to output PFE 330, via switching fabric 320.

Although FIG. 4 shows exemplary components of exemplary portion 400 of network device 110, in other implementations, portion 400 may contain fewer components, different components, differently arranged components, or additional components than depicted in FIG. 4. Alternatively, or additionally, one or more components of portion 400 may perform one or more other tasks described as being performed by one or more other components of portion 400.

Figure 5:
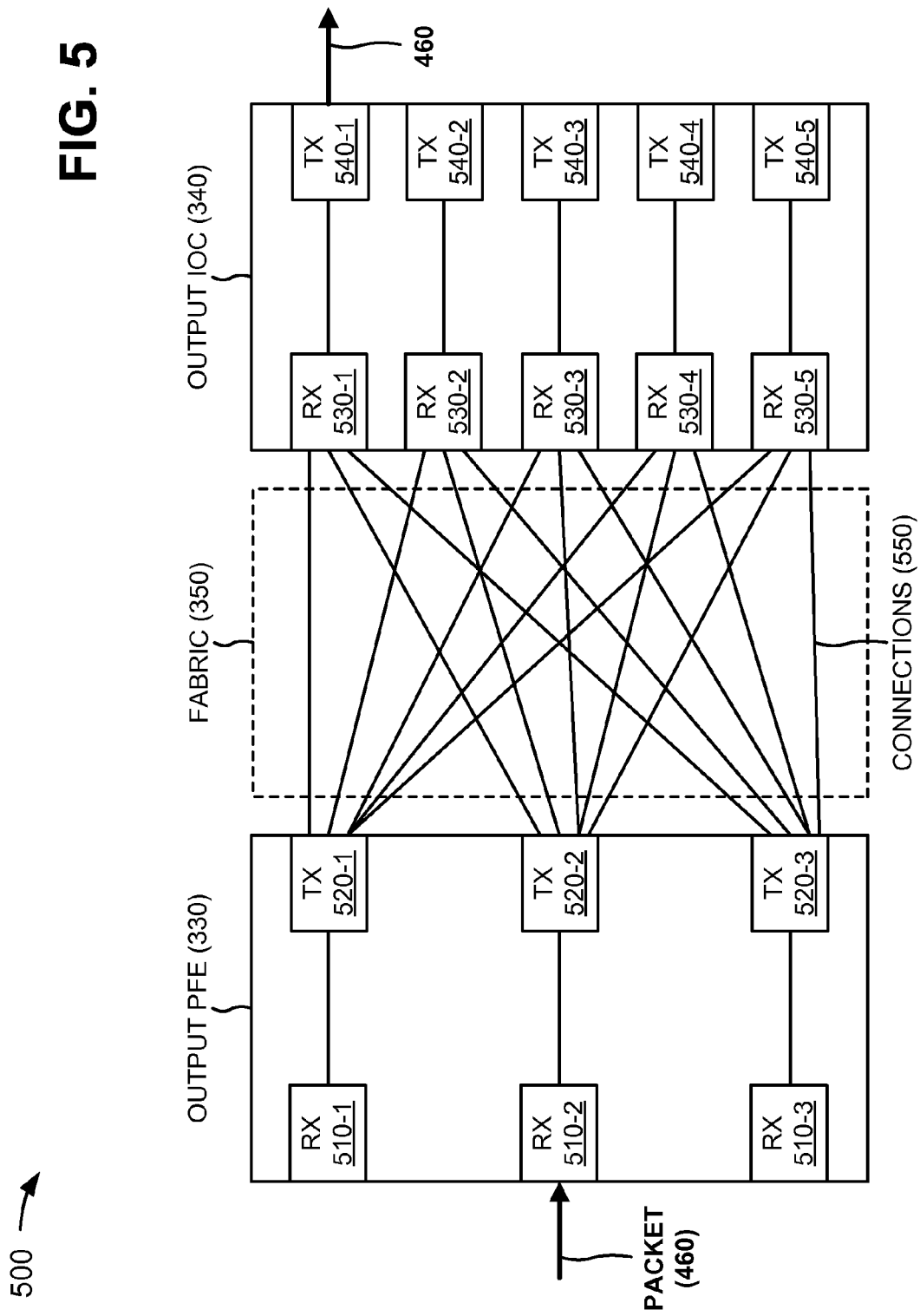
FIG. 5 is a diagram of exemplary interactions among components of another exemplary portion of the network device.

FIG. 5 is a diagram of exemplary interactions among components of another exemplary portion 500 of network device 110. As shown, exemplary portion 500 may include output PFE 330, output IOC 340, and fabric 350. Output PFE 330, output IOC 340, and fabric 350 may include the functionality described above in connection with, for example, FIG. 3.

As further shown in FIG. 5, output PFE 330 may include a group of receivers (RXs) 510-1 through RX 510-3 (collectively referred to as "RXs 510" and, in some instances, singularly as "RX 510") interconnected with a group of transmitters (TXs) 520-1 through 520-3 (collectively referred to as "TXs 520" and, in some instances, singularly as "TX 520"). Although FIG. 5 shows three RXs 510 and three TXs 520, in other implementations, output PFE 330 may include more or fewer RXs 510 and/or TXs 520.

RX 510 may be a point of entry for incoming packets. RX 510 may look up a destination address of an incoming packet in a forwarding table to determine its destination port (i.e., route lookup). In exemplary implementations, RX 510 may receive (e.g., may be an entry point) packets from TXs 440 of input PFE 310.

TX 520 may store packets and may schedule packets for delivery to output IOC 340. TX 520 may include scheduling algorithms that support priorities and guarantees. In an exemplary implementation, TX 520 may send packets (e.g., may be an exit point) to output IOC 340, via fabric 350.

Output IOC 340 may include a group of receivers (RXs) 530-1 through RX 530-5 (collectively referred to as "RXs 530" and, in some instances, singularly as "RX 530") interconnected with a group of transmitters (TXs) 540-1 through 540-5 (collectively referred to as "TXs 540" and, in some instances, singularly as "TX 540"). Although FIG. 5 shows five RXs 530 and five TXs 540, in other implementations, output IOC 340 may include more or fewer RXs 530 and/or TXs 540. In an exemplary implementation, output IOC 340 may include more RXs 530 than TXs 520 provided in output PFE 330, and a single TX 520 may interconnect with multiple RXs 530 (e.g., a point-to-multipoint connection).

RX 530 may be a point of entry for incoming packets. RX 530 may look up a destination address of an incoming packet in a forwarding table to determine its destination port (i.e., route lookup). In exemplary implementations, RX 530 may receive (e.g., may be an entry point) packets from TXs 520, via fabric 350.

TX 540 may store packets and may schedule packets for delivery to network 120 (not shown). TX 540 may include scheduling algorithms that support priorities and guarantees. In an exemplary implementation, TX 540 may send packets (e.g., may be an exit point) on a physical link to network 120 (e.g., for delivery to another network device 110).

As further shown in FIG. 5, fabric 350 may provide connections 550 between TXs 520 of output PFE 330 and RXs 530 of output IOC 340. In one example, packet 460 may be received (e.g., from TX 440-1 of input PFE 310) at RX 510-2 (e.g., of output PFE 330) and may be provided to TX 520-2. Based on information contained in packet 460 (e.g., destination information) and UPOH protocol 360, TX 520-2 may forward packet 460 to one of RXs 530 of output IOC 340. As shown, TX 520-2 may forward packet 460 to RX 530-1 (e.g., via connection 550 provided between TX 520-2 and RX 530-1 in fabric 350), RX 530-1 may forward packet 460 to TX 540-1, and TX 540-1 may forward packet 460 to network 120 (not shown).

Although FIG. 5 shows exemplary components of exemplary portion 500 of network device 110, in other implementations, portion 500 may contain fewer components, different components, differently arranged components, or additional components than depicted in FIG. 5. Alternatively, or additionally, one or more components of portion 500 may perform one or more other tasks described as being performed by one or more other components of portion 500.

Exemplary Network Device Functionality

Figure 6:
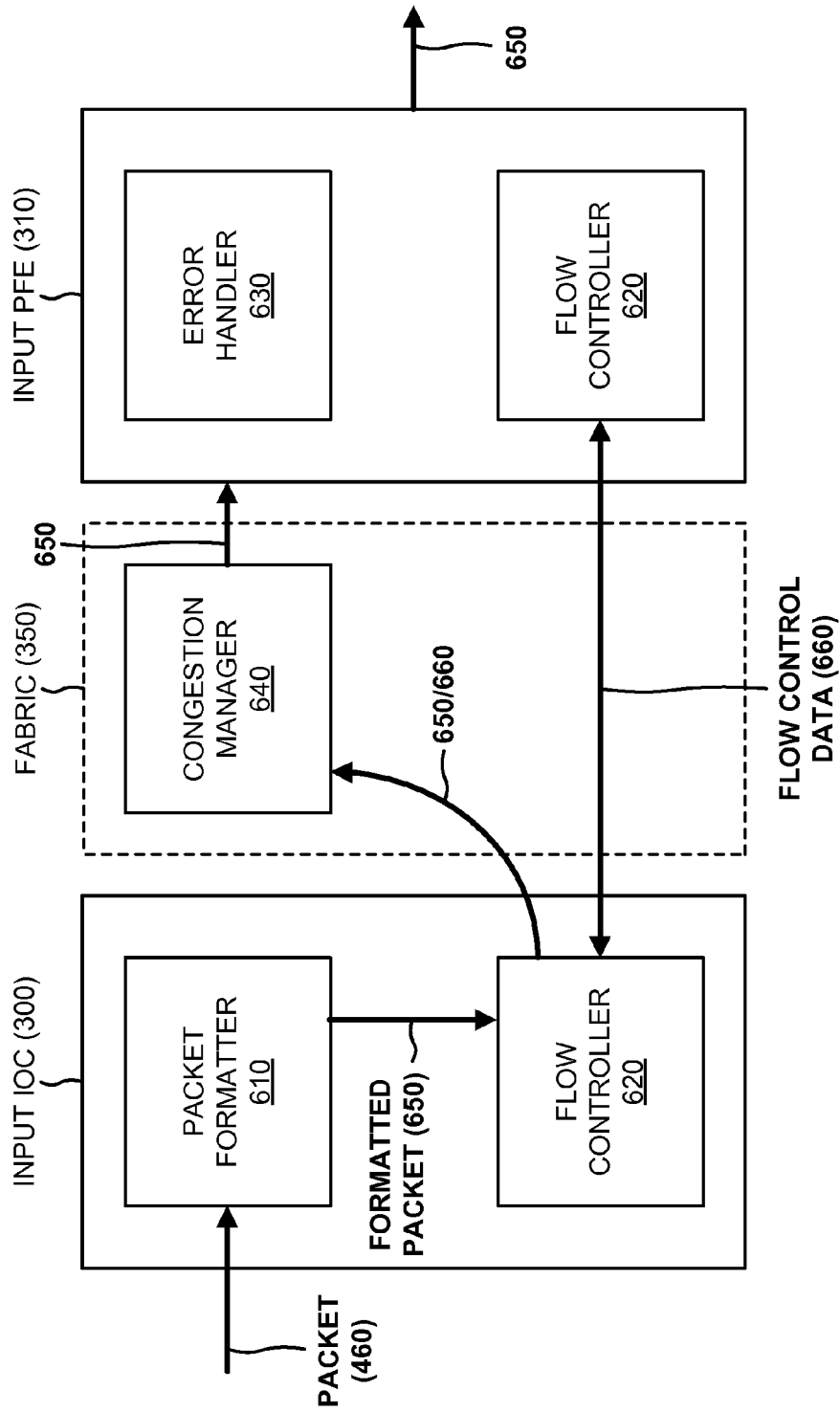
FIG. 6 is a diagram of exemplary functional components of a portion of the network device.

FIG. 6 is a diagram of exemplary functional components of a portion 600 of network device 110. In one example, the functional components described in connection with FIG. 6 may be implemented by one or more of the components depicted in FIGS. 2-5. As shown in FIG. 6, input IOC 300 may include a packet formatter 610 and a flow controller 620, input PFE 310 may include flow controller 620 and an error handler 630, and fabric 350 may include a congestion manager 640.

Packet formatter 610 may include hardware or a combination of hardware and software that may receive packet 460 (e.g., via a physical link), may format packet 460 to produce a formatted packet 650, and may provide formatted packet 650 to flow controller 620 (e.g., within input IOC 300). In an exemplary implementation, packet formatter 610 may generate formatted packet 650 in accordance with UPOH protocol 360.

In one example, packet formatter 610 may format packet 460 so that requests and grants may be used to handle packet routing between IOCs 300/340 and PFEs 310/330 and so that fabric 350 may manage congestion. Packet formatter 610 may format packet 460 to include one or more of the payload fields set forth in Table 1.

TABLE 1

| Name | Width (bits) | Abbreviation | Description |
|---|---|---|---|
| RequestValid | 1 | rv | Cell contains a valid request |
| RequestDest/Source | 9 | rd/rs | Destination/Source of request |
| GrantValid | 1 | gv | Cell contains a valid grant |
| GrantDest/Source | 9 | gd/gs | Destination/Source of grant |
| DataValid | 1 | dv | Cell contains a valid data payload |
| DataDest/Source | 9 | dd/ds | Destination/Source of the data payload |
| SequenceNumber | 11 | sq# | Per-stream sequence number. If flow control cell, then may be transmitted as zeros and ignored by receiver. |
| FlowControl | 1 | fc | If "1" then cell is a flow control cell |
| StreamNumber | 7 | st# | Stream number - data in cell is for this stream |
| CellType | 5 | ct | Encodes the interpretation of data chunks |
| Data0 | 128 | d0 | Data Chunk 0 |
| Data1 | 128 | d1 | Data Chunk 1 |
| Data2 | 128 | d2 | Data Chunk 2 |
| Data3 | 128 | d3 | Data Chunk 3 |
| RenoSequenceNumber | 4 | rsq# | Sequence number used to bond two point-to-point channels |
| Reserved | 17 | R | Reserved bits |

In UPOH protocol 360, the "SequenceNumber" field may be a per-stream pair rather than a per source and destination pair. This may enable a flow control scheme (e.g., provided by flow controller 620) used in UPOH protocol 360 and may improve error detection and recovery. The "SequenceNumber" field may not be used by flow control (fc) cells, may be driven to eleven bits of zero by transmitters (e.g., TXs 420), and may be ignored by receivers (e.g., RXs 430). The "StreamNumber" field may indicate which stream that data in a cell is targeted. If the "FlowControl" field is set, the "StreamNumber" field may indicate which set of flow control bits are being sent. There may be a separate stream number space for each direction between each source (e.g., TXs 420) and destination (e.g., RXs 430).

The "CellType" field may indicate how data chunks of a packet (e.g., packet 460) should be interpreted. The "CellType" field may define what part of a packet each data chunk represents as well as how the chunks are assigned to packets. One or more data chunks may make up a sub cell, and a sub cell can be made up of one, two, three, or four "16" byte chunks. Each sub cell may contain data for a single packet. The "CellType" field may also indicate whether or not each sub cell is completely full of data. A lower-numbered chunk may make up upper bits of a sub cell.

Table 3 (below) provides exemplary encodings for combinations of the "CellType" field. The reserved column may indicate that a field is not currently used in UPOH protocol 360. The non-reserved cell encodings may limit a number of end of packet (EOP) indications per cell to one. This may make a maximum packet-per-second rate match a maximum cell-per-second rate. The "Packet 0 Data" and "Packet 1 Data" columns may list data chunks that make up sub cells. Data chunks may be given in most significant to least significant bit order. Table 2 (below) provides a description of the abbreviations used in Table 3.

TABLE 2

| Abbreviation | Description |
|---|---|
| FC | First Cell |
| MC | Middle Cell |
| LC | Last Cell |
| SC | Single Cell Packet |
| NF | Data chunk Not Full |
| F | Data chunk Full |
| E | Error |
| xxB | xx Bytes of data |
| Dx | Data Chunk x |
| LBPx | Last Byte Pointer x = Dx[5:0] |
| SOP | Start of packet |
| EOP | End of packet |
| WP | Whole Packet |

TABLE 3

| Case | CellType | Packet 0 Data | Packet 0 Length (B) | Packet 1 Data | Packet 1 Length (B) | Description |
|---|---|---|---|---|---|---|
| FC | 5'b00000 | D0, D1, D2, D3 | 64 | — | — | SOP |
| MC | 5'b00100 | D0, D1, D2, D3 | 64 | — | — | Middle of packet |
| LC_NF | 5'b01010 | D0, D1, D2, D3 | LBP3 + 1 | — | — | EOP - not full |
| LC_F | 5'b01001 | D0, D1, D2, D3 | 64 | — | — | EOP |
| LC_E | 5'b11000 | D0, D1, D2, D3 | LBP3 + 1 | — | — | EOP with error |

TABLE 3-continued

| Case | CellType | Packet 0 Data | Packet 0 Length (B) | Packet 1 Data | Packet 1 Length (B) | Description |
|---|---|---|---|---|---|---|
| SC_NF | 5'b01110 | D0, D1, D2, D3 | LBP3 + 1 | — | — | Single cell packet - not full |
| SC_F | 5'b01101 | D0, D1, D2, D3 | 64 | — | — | Single cell packet - full |
| SC_E | 5'b11100 | D0, D1, D2, D3 | LBP3 + 1 | — | — | Single cell packet with error |
| LC_NF_FC_16 | 5'b00010 | D0, D1, D2 | LBP2 + 1 | D3 | 16 | Packet0: EOP w/1-47B Packet1: SOP w/16B |
| LC_F_FC_16 | 5'b00001 | D0, D1, D2 | 48 | D3 | 16 | Packet0: EOP w/48B Packet1: SOP w/16B |
| LC_E_FC_16 | 5'b11001 | D0, D1, D2 | LBP2 + 1 | D3 | 16 | Packet0: EOP w/error w/1-48B Packet1: SOP w/16B |
| LC_NF_FC_32 | 5'b00110 | D0, D1 | LBP1 + 1 | D2, D3 | 32 | Packet0: EOP w/1-31B Packet1: SOP w/32B |
| LC_F_FC_32 | 5'b00101 | D0, D1 | 32 | D2, D3 | 32 | Packet0: EOP w/32B Packet1: SOP w/32B |
| LC_E_FC_32 | 5'b11010 | D0, D1 | LBP1 + 1 | D2, D3 | 32 | Packet0: EOP w/error w/1-32B Packet1: SOP w/32B |
| LC_NF_FC_48 | 5'b01000 | D0 | LBP0 + 1 | D1, D2, D3 | 48 | Packet0: EOP w/1-15B Packet1: SOP w/48B |
| LC_F_FC_48 | 5'b00111 | D0 | 16 | D1, D2, D3 | 48 | Packet0: EOP w/16B Packet1: SOP w/48B |
| LC_E_FC_48 | 5'b11011 | D0 | LBP0 + 1 | D1, D2, D3 | 48 | Packet0: EOP w/error w/1-16B Packet1: SOP w/48B |
| Reserved | 5'b10000 | | | | | |
| Reserved | 5'b10100 | | | | | |
| Reserved | 5'b11111 | | | | | |
| *LC_NF_SC_NF | 5'b01011 | D0 | LBP0 + 1 | D1, D2, D3 | LBP3 + 1 | Packet0: EOP w/1-15B Packet1: SOP w/1-47B |
| *LC_F_SC_NF | 5'b00011 | D0 | 16 | D1, D2, D3 | LBP3 + 1 | Packet0: EOP w/16B Packet1: SOP w/1-47B |
| *LC_E_SC_NF | 5'b10001 | D0 | LBP0 + 1 | D1, D2, D3 | LBP3 + 1 | Packet0: EOP w/error w/1-16B Packet1: WP w/1-47B |
| *LC_NF_SC_F | 5'b01111 | D0 | LBP0 + 1 | D1, D2, D3 | 48 | Packet0: EOP w/1-15B Packet1: WP w/48B |
| *LC_F_SC_F | 5'b01100 | D0 | 16 | D1, D2, D3 | 48 | Packet0: EOP w/16B Packet1: WPw/48B |
| *LC_E_SC_F | 5'b10010 | D0 | LBP0 + 1 | D1, D2, D3 | 48 | Packet0: EOP w/error w/1-16B Packet1: WP w/48B |
| *LC_NF_SC_E | 5'b10110 | D0 | LBP0 + 1 | D1, D2, D3 | LBP3 + 1 | Packet0: EOP w/1-15B Packet1: WP w/error w/1-48B |
| *LC_F_SC_E | 5'b10101 | D0 | 16 | D1, D2, D3 | LBP3 + 1 | Packet0: EOP w/16B Packet1: WP w/error w/1-48B |
| *LC_E_SC_E | 5'b10111 | D0 | LBP0 + 1 | D1, D2, D3 | LBP3 + 1 | Packet0: EOP w/error w/1-16B Packet1: WP w/error w/1-48B |
| *SC_NF_FC_16 | 5'b10011 | D0, D1, D2 | LBP2 + 1 | D3 | 16 | Packet0: WP w/1-47B Packet1: SOP w/16B |
| *SC_F_FC_16 | 5'b11110 | D0, D1, D2 | 48 | D3 | 16 | Packet0: WP w/48B Packet1: SOP w/16B |
| *SC_E_FC_16 | 5'b11101 | D0, D1, D2 | LBP2 + 1 | D3 | 16 | Packet0: WP w/error w/1-48B Packet1: SOP w/16B |

Figure 7:
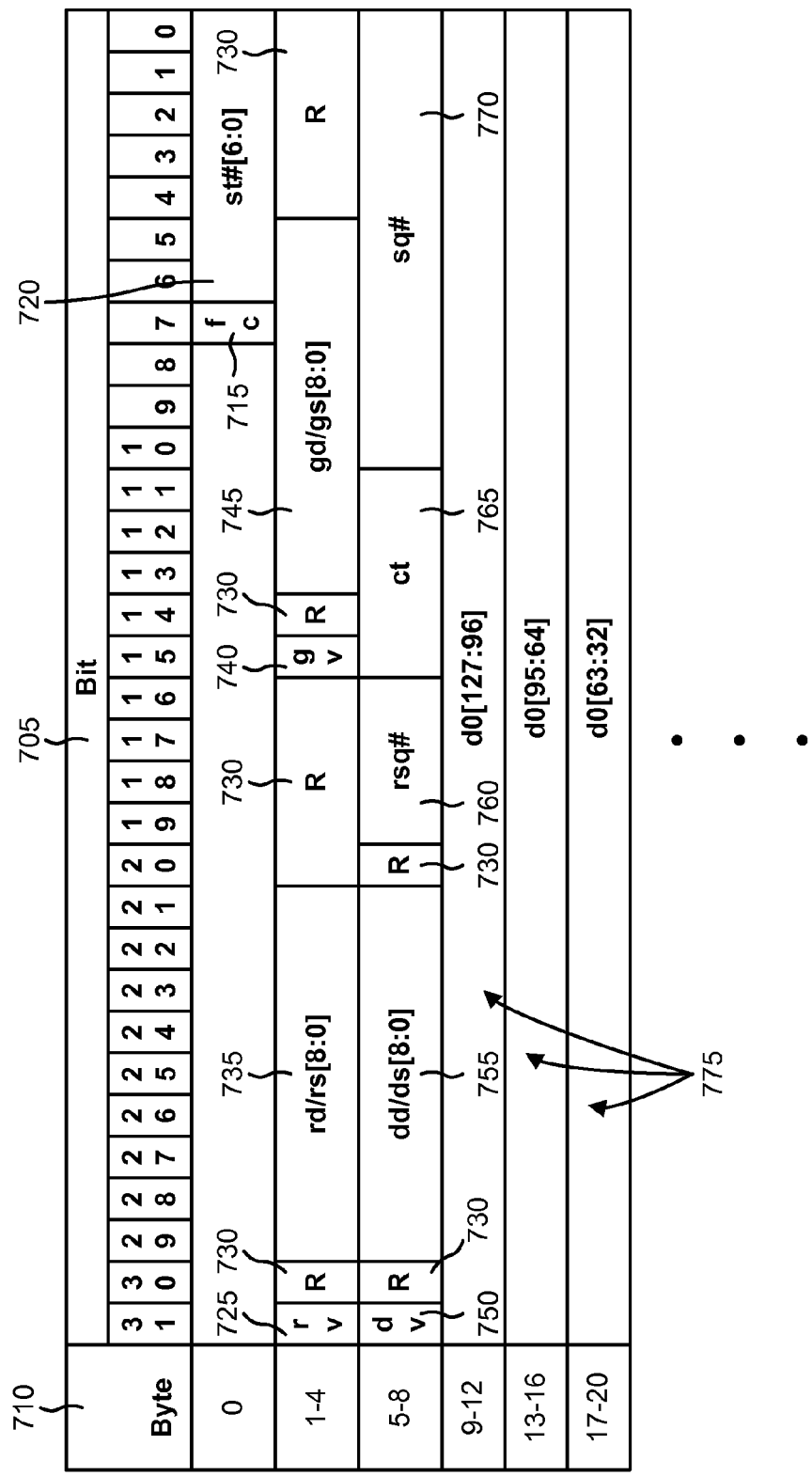
FIG. 7 is a diagram of an exemplary packet format that may be provided by the network device.

FIG. 7 is a diagram of an exemplary packet format 700 that may be provided by network device 110 (e.g., by packet formatter 610). In an exemplary implementation, packet format 700 may include a payload format in accordance with UPOH protocol 360 (i.e., a "UPOH payload format"). As shown, packet format 700 may include a bit field 705 and a byte field 710 and multiple entries 715-775 associated with bit field 705 and byte field 710. Although FIG. 7 shows exemplary information that may be associated with packet format 700, in other implementations, packet format 700 may include less information, different information, differently arranged information, or additional information than depicted in FIG. 7.

Bit field 705 may include information associated with a number of bits available in packet format 700. For example, as shown in FIG. 7, bit field 705 may be associated with thirty-two (32) bits labeled zero (0) to thirty-one (31).

Byte field 710 may include information associated with a number of bytes available in packet format 700. For example, byte field 710 may include an entry for byte zero (0) and eighteen entries that include four (4) bytes each. Thus, in one example, byte field 710 may provide entries for up seventy-two (72) bytes.

Entry 715 may be associated with byte zero (0) (e.g., provided in byte field 710) and bit seven (7) (e.g., provided in bit field 705), and may be designated as a flow control (fc) cell.

Entry 720 may be associated with byte zero (0) (e.g., provided in byte field 710) and bits zero (0) through six (6) (e.g., provided in bit field 705), and may be designated as a stream number (st#) cell (e.g., data in this cell may be for a stream).

Entries 730 may be associated with bytes one (1) through four (4) (e.g., provided in byte field 710); and bit thirty (30), bits sixteen (16) through twenty (20), bit fourteen (14), and bits zero (0) through four (4) (e.g., provided in bit field 705). Entries 730 may also be associated with bytes five (5) through eight (8) (e.g., provided in byte field 710); and bit thirty (30) and bit twenty (20) (e.g., provided in bit field 705). Entries 730 may be designated as reserved (R) bits.

Entry 735 may be associated with bytes one (1) through four (4) (e.g., provided in byte field 710) and bits twenty-one (21) through twenty-nine (29) (e.g., provided in bit field 705), and may provide a destination/source of a request (rd/rs).

Entry 740 may be associated with bytes one (1) through four (4) (e.g., provided in byte field 710) and bit fifteen (15) (e.g., provided in bit field 705), and may indicate that a cell contains a valid grant (gv).

Entry 745 may be associated with bytes one (1) through four (4) (e.g., provided in byte field 710) and bits five (5) through thirteen (13) (e.g., provided in bit field 705), and may provide a destination/source of a grant (gd/gs).

Entry 750 may be associated with bytes five (5) through eight (8) (e.g., provided in byte field 710) and bit thirty-one (31) (e.g., provided in bit field 705), and may indicate that a cell contains a valid data payload (dv).

Entry 755 may be associated with bytes five (5) through eight (8) (e.g., provided in byte field 710) and bits twenty-one (21) through twenty-nine (29) (e.g., provided in bit field 705), and may provide a destination/source of a data payload (dd/ds).

Entry 760 may be associated with bytes five (5) through eight (8) (e.g., provided in byte field 710) and bits sixteen (16) through nineteen (19) (e.g., provided in bit field 705), and may provide a sequence number used to bond point-to-point channels (rsq#).

Entry 765 may be associated with bytes five (5) through eight (8) (e.g., provided in byte field 710) and bits eleven (11) through fifteen (15) (e.g., provided in bit field 705), and may provide a cell type (ct) that encodes an interpretation of data chunks.

Entry 770 may be associated with bytes five (5) through eight (8) (e.g., provided in byte field 710) and bits zero (0) through ten (10) (e.g., provided in bit field 705), and may provide a per-stream sequence number (sq#).

Each of entries 775 may be associated with bits zero (0) through thirty-one (31) (e.g., provided in bit field 705) and bytes nine (9) through twelve (12), bytes thirteen (13) through sixteen (16), and bytes seventeen (17) through twenty (20), respectively (e.g., provided in byte field 710). Entries 775 may include data chunks associated with a packet (e.g., packet 460).

Returning to FIG. 6, flow controller 620 (e.g., associated with input IOC 300) may include hardware or a combination of hardware and software that may receive formatted packet 650 from packet formatter 610, and may receive flow control data 660 from flow controller 620 of input PFE 310. Flow control data 660 may include information that may control the flow of packets (e.g., formatted packet 650) from a source component (e.g., a transmitter component, such as input IOC 300) to a destination component (e.g., a receiver component, such as input PFE 310). Flow controller 620 (e.g., associated with input IOC 300) may provide formatted packet 650 and its associated flow control data 660 to congestion manager 640. Flow controller 620 of input PFE 310 may perform functions similar to flow controller 620 of input IOC 300.

In an exemplary implementation, UPOH protocol 360 may carry flow control data 660 as if it were packet data on a stream. For example, a flow control (fc) bit (e.g., entry 715 in FIG. 7) may indicate that data in a cell is flow control data rather than packet data. A stream number (st#) field (e.g., entry 720 in FIG. 7) may indicate which group of flow control data is being transported in the cell.

Flow control data 660 may be divided into sections that are less than "512" bits in length. If there is more flow control data 660 than can be stored in a section, a stream number (st#) field may indicate which section of flow control data 660 is in a cell. Each section of flow control data 660 may be divided into one to four data chunks (e.g., where each data chunk may be up to "128" bits in length). For example, if flow control data 660 is "192" bits in length, UPOH protocol 360 may pretend that this data is a "192" bit packet and may send it as a single cell packet (e.g., data chunk not full (SC_NF) cell). A flow control (fc) bit (e.g., entry 715 in FIG. 7) may be set, since this is flow control data, and a stream number (st#) field (e.g., entry 720 in FIG. 7) may be zero, since this is the first and only section of flow control data 660. If flow control data 660 was "704" bits in length, flow control data 660 may be sent in two cells. A first cell may contain "512" bits of flow control data 660 and may have a stream number (st#) field of zero. A second cell may contain "192" bits of flow control data 660 and may have a stream number (st#) field of one.

Per-stream flow control updates (e.g., flow control data 660) in UPOH protocol 360 may be transmitted in a sixteen (16) bit field, which may allow for up to thirty-two (32) streams worth of flow control data 660 to be carried in each cell. The sixteen bit fields may be packed from a most significant bit to a least significant bit in flow control data 660. For example, "Data0[127:112]" may include a flow control update for stream zero and "Data15[111:98]" may include a flow control update for stream fifteen. If a packet (e.g., packet 460) is using multiple fabric priorities, flow control data 660 for all streams may be sent on a highest fabric (e.g., fabric 350) priority. This may ensure a certain amount of bandwidth is available for flow control data 660. In an exemplary implementation, flow control data 660 (e.g., in a transmitter device, such as TXs 420 of input IOC 300) may have a higher priority for being in a cell than normal stream data.

In contrast to XON/XOFF, single bit flow control used in some protocols, flow control in UPOH protocol 360 may cause a receiver component (e.g., input PFE 310) to send a per-stream sequence number (e.g., a Flow Control Sequence Number (FCSN)) to a transmitter component (e.g., input IOC 300). The FCSN may function as a credit update that is resilient to errors. The FCSN may indicate a last sequence number (e.g., incremented by one) that the transmitter component may be permitted to send. At stream initialization, the transmitter component's copy of the FCSN and a next sequence number to transmit (NTSN) may be initialized to zero. The transmitter component may only send a packet if the NTSN is less than the FCSN. Since zero is equal to zero (e.g., a starting state), the transmitter component may be unable to send a packet until the transmitter component receives a flow control update from the receiver component. In one example, if the NTSN is six (6) and the FCSN is ten (10), then the transmitter component may send four cells (e.g., cells 6, 7, 8, and 9) before waiting for a flow control update from the receiver component. NTSN may be incremented after a packet is transmitted.

The receiver component may compute the next FCSN to send to the transmitter component by tracking an amount of buffer space available for each stream in units of cells (e.g., assuming that all received cells are completely packed). The receiver component may add the number of cells of available buffer to a next expected receive sequence number (NRSN) and the result may include the FCSN to send to the transmitter component. For example, assume that the receiver component has a ten kilobyte (kB) buffer organized in sixteen byte chunks and is expecting sequence number ten (10) next. In this scenario, the receiver component may determine that it has "160" cells worth of buffer available and may add this number to the NRSN of ten (10) to obtain a FCSN of "170." The receiver component may send the FCSN to the transmitter component, and the transmitter component may send cells up through sequence number "169."

If the transmitter component is not sending full cells and the receiver component allocates space at a finer granularity, the receiver component may account for this when it recalculates an amount of space available. For example, assume that the NTSN is ten (10), the FCSN is twelve (12), and the receiver component has eight free "16" byte chunks (i.e., enough for two cells). The transmitter component may send two "32" byte packets in individual cells using sequence numbers "10" and "11." The receiver component may pack the two packets into four chunks (e.g., leaving a full free cell) so that the receiver component may send a new FCSN of thirteen (13) (e.g., allowing the transmitter component to send another cell).

In an exemplary implementation, UPOH protocol 360 may send flow control data 660 from a receiver component (e.g., input IOC 300) to a transmitter component (e.g., input PFE 310) when necessary. Each flow control stream may keep track of how much a recomputed FCSN has changed since the last time a flow control update was sent. When the difference exceeds a threshold, a flow control update may be sent to an appropriate transmitter component. Any time a flow control update is triggered, the current FCSN values may be sent for all flow control streams in the receiver component that are targeted by the update. If there are more active flow control streams than can fit in a single cell, either multiple cells of updates may be sent or a flow control update may be sent for flow control streams that occupy a same flow control group (e.g., include the same flow control "StreamNumber").

Such an arrangement may have the benefit of sending flow control updates between a receiver component and a transmitter component only as often as a fastest flow control stream provided between the two components requires. The rate may also be set based on an actual offered load. This may ensure that, if there is one active flow control stream consuming a full bandwidth into a receiver component, the flow control rate will be the same as if it were set to a fixed heartbeat. If the load is lower than this, the flow control rate may decrease and more of bandwidth may be available for traffic.

Alternatively, or additionally, a countdown timer may be provided (e.g., for each flow control stream) that may trigger a flow control update for the flow control stream if the timer expires. The timer may be reset each time a flow control update is sent. The frequency of the timer may be set low (e.g., to about one millisecond) so that an amount of generated traffic may be low. The following exemplary procedure shows a flow control sending decision:

```
If((trigger and (timer > Tup_min)) or (timer > Tup_max)){
    Send FC update
    Clear timer
}
``` where "trigger" may include an indication that a flow control stream has passed its threshold, "Tup_min" may include a minimum time between flow control updates, "Tup_max" may be a time where a component refreshes the flow control data if a threshold has not been exceeded for a period of time.

Table 4 provides transmit and receive flow control states per stream that may be maintained by a receiver component and a transmitter component.

TABLE 4

| Block | State | Width (bits) | Initial value | Description |
|---|---|---|---|---|
| Transmit | NTSN | 11 | 0 | Next sequence number to transmit |
| | FCSN | 11 | 0 | Flow control sequence number. Transmitter may send as long as NTSN < FCSN |
| Receive | NRSN | 11 | 0 | Next sequence number expected from transmitter |
| | LFCSN | 11 | 0 | Value of last FCSN sent to transmitter for this stream |
| | FreeCells | 11 | — | Amount of free buffer space in units of cells |
| | Thresh | 11 | — | Threshold to send flow control update. If NRSN + FreeCells − LFCSN > Thresh, update may be sent |

In an exemplary implementation, a local receiver (e.g., RX 410) of a component (e.g., input IOC 300) may generate flow control data 660, but may provide flow control data 660 to a local transmitter (e.g., TX 420) for sending to a local receiver (e.g., RX 430) of an appropriate endpoint (e.g., input PFE 310). The endpoint's local receiver (e.g., RX 430) may provide flow control data 660 to a local transmitter (e.g., TX 440).

As further shown in FIG. 6, error handler 630 may include hardware or a combination of hardware and software that may perform error handling for input PFE 310. Fabric 350 may lose cells due to extreme congestion or link errors. When cells are lost, one or more of a request, a grant, four chunks of packet data, and/or flow control data 660 may be lost. To recover from lost requests and grants, error handler 630 may periodically send a "fake request" from each source (e.g., input IOC 300) to each destination (e.g., input PFE 310). The fake request may produce a grant similar to a normal request. If a request was lost, the fake request may take the place of the lost request. If a grant was lost, the fake request may generate a grant that may take the place of the lost grant. Each source (e.g., via error handler 630) may keep track of a number of real requests that the source has outstanding to each destination. Error handler 630 may increment a counter when a real request to a destination is sent and may decrement the counter when a real grant arrives. If error handler 630 sends a fake request when a request or a grant was not lost, grants may arrive when the counter is zero. Such grants may be ignored and dropped by error handler 630.

There may be a separate sequence number space for each stream between a source and a destination (in each direction). Error handler 630 may detect a dropped cell by determining if there are any skipped sequence numbers. When a dropped cell is detected, error handler 630 may clean up the affected stream by generating an error for partially received packets and by deleting data chunks on the stream until a start of packet (SOP) chunk arrives.

The loss of flow control data 660 may not pose a problem for error handler 630 because if flow control data 660 is lost, a transmitter component may merely determine that a receiver component is fuller than it actually is. Furthermore, error handler 630 may ensure that there is no chance of overflow.

Congestion manager 640 may include hardware or a combination of hardware and software that may receive formatted packet 650 and flow control data 660 from flow controller 620 (e.g., of input IOC 300). Congestion manager 640 may perform congestion management for formatted packet 650 (e.g., based on flow control data 660), and may forward formatted packet 650 to input PFE 310 based on results of the congestion management and/or based on flow control data 660. Input PFE 310 may forward formatted packet 650 (e.g., in accordance with UPOH protocol 360) to another component of network device 110 (e.g., to switching fabric 320 (FIG. 3)).

In an exemplary implementation, congestion manager 640 may determine whether bandwidth is available at input PFE 310 for formatted packet 650, and may allocate bandwidth to input IOC 300 when bandwidth is available at input PFE 310. Congestion manager 640 may forward formatted packet 650 to input PFE 310 when bandwidth is available at input PFE 310 for formatted packet 650, and input PFE 310 may forward formatted packet 650 to another destination (e.g., to output PFE 330, via switching fabric 320).

In certain configurations, network device 110 may include a number of IOCs (e.g., input IOCs 300) communicating with an oversubscribed PFE (e.g., input PFE 310). Congestion manager 640 may manage such configurations using a request/grant procedure. When an endpoint (e.g., input IOC 300) has data on a stream (or streams) that input IOC 300 needs to send to another endpoint (e.g., input PFE 310), input IOC 300 may send a request. When input IOC 300 receives a grant from input PFE 310, input IOC 300 may send a data cell containing the stream data to input PFE 310. Congestion manager 640 may turn requests into grants, and may manage allocation of bandwidth between all active sources (e.g., between input IOC 300 and input PFE 310). For example, if there are N sources, congestion manager 640 may provide 1/N of the bandwidth to one of the sources (e.g., in a worst case scenario).

Whenever a flow control update is triggered, a request may be sent. After a flow control update is triggered, a next available grant from an appropriate destination may be used to send the flow control update. Congestion manager 640 may sample a current flow control state when a grant arrives in order to ascertain a current status. In one example, congestion manager 640 may limit a request rate to less than or equal to ninety percent of available request slots.

In a congested system, congestion manager 640 may ensure that all sources have fair access to each destination. A congested system (e.g. that provides preferential treatment to some packets) may support multiple fabric priorities. Congestion manager 640 may provide a per-packet stream and per-flow control stream configurable destination in fabric 350.

To ensure that fabric 350 performs well across a widest range of implementation choices, congestion manager 640 may require that each non point-to-point transmitter component implements a grant-to-data delay function. The transmitter component may choose to delay an arriving grant if a grant-to-data turnaround is fast and deterministic, or the transmitter component may delay a data cell being provided to fabric 350. Either way, congestion manager 640 may implement a delay that permits data cell transmit time to be adjusted.

Although FIG. 6 shows exemplary functional components of portion 600 network device 110, in other implementations, network device 110 may contain fewer functional components, different functional components, differently arranged functional components, or additional functional components than depicted in FIG. 6. For example, one or more of input IOCs 300, input PFEs 310, output PFEs 330, and/or output IOCs 340 may include packet formatter 610, flow controller 620, and/or error handler 630. Alternatively, or additionally, one or more functional components of network device 110 may perform one or more other tasks described as being performed by one or more other functional components of network device 110.

Figure 8:
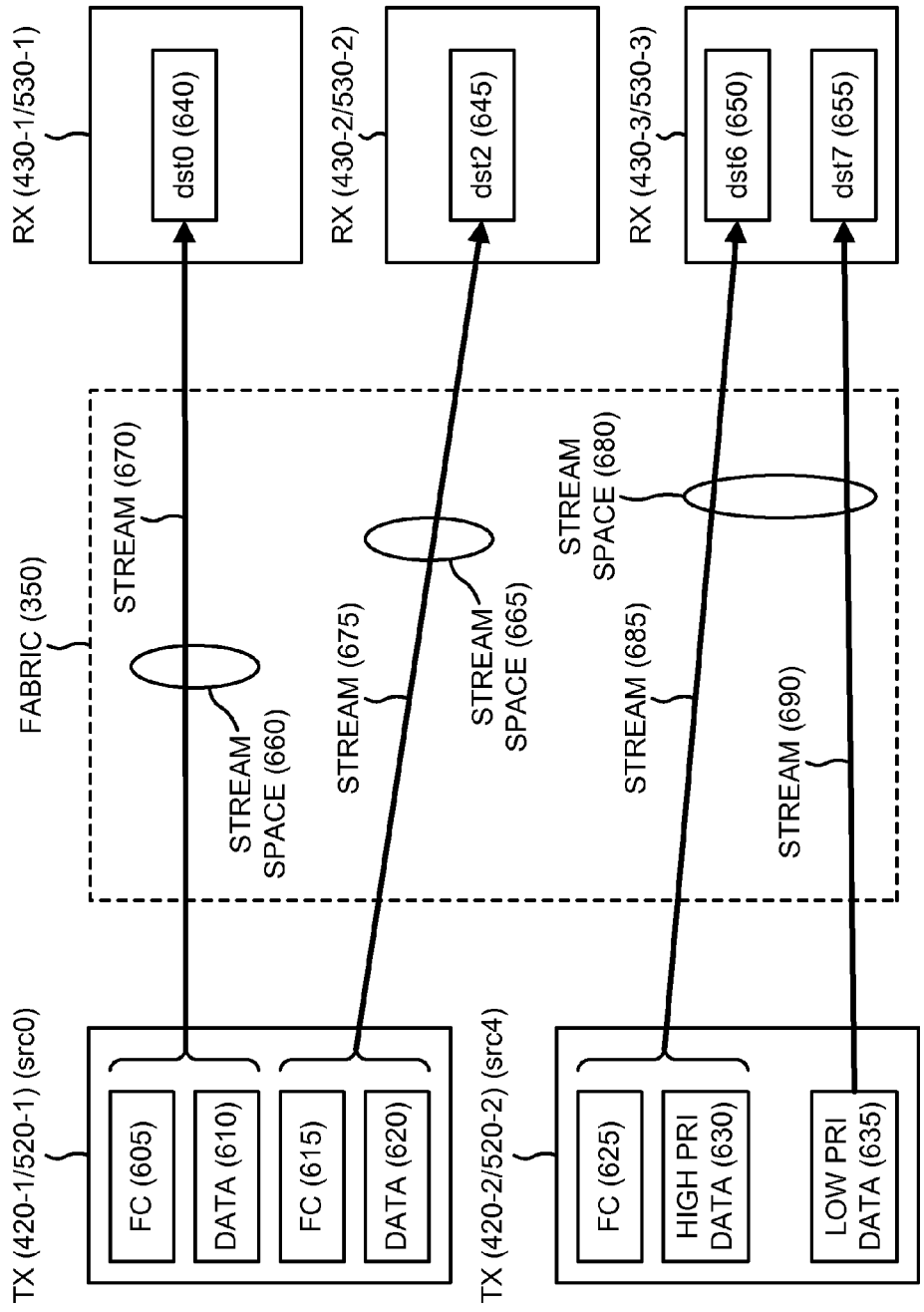
FIG. 8 is a diagram of exemplary interactions among components of another exemplary portion of the network device.

FIG. 8 is a diagram of exemplary interactions among components of another exemplary portion 800 of network device 110. As shown, exemplary portion 800 may include fabric 350, TX 420-1 or 520-1, TX 420-2 or 520-2, RX 430-1 or 530-1, RX 430-2 or 530-2, and RX 430-3 or 530-3. Fabric 350, TX 420-1/520-1, TX 420-2/520-2, RX 430-1/530-1, RX 430-2/530-2, and RX 430-3/530-3 may include the functionality described above in connection with, for example, FIGS. 3-5.

TX 420-1/520-1 may be a source (e.g., "src0") component and may include a flow control (FC) packet 605 associated with a data packet 610, and another FC packet 615 associated with another data packet 620. FC packets 605/615 may include flow control information, such as flow control data 660, as described above in connection with FIG. 6. Data packets 610/620 may include the features described above in connection with packet 460, and may include data to be transported from network device 110. In one example, TX 420-1/520-1 may support two connections (e.g., one connection to RX 430-1/530-1 and another connection to RX 430-2/530-2).

TX 420-2/520-2 may be a source (e.g., "src4") component and may include a FC packet 625 associated with a high priority (PRI) data packet 630, and may include a low priority data packet 635. FC packet 625 may include flow control information, such as flow control data 660, as described above in connection with FIG. 6. High priority data packet 630 may include the features described above in connection with packet 460, and may include high priority data to be transported from network device 110. Low priority data packet 635 may include the features described above in connection with packet 460, and may include low priority data (e.g., lower than higher priority data) to be transported from network device 110. In one example, TX 420-2/520-2 may support two connections to RX 430-3/530-3.

As further shown in FIG. 8, RX 430-1/530-1 may include a destination (e.g., "dst0") 640; RX 430-2/530-2 may include a destination (e.g., "dst2") 645; and RX 430-3/530-3 may include a destination (e.g., "dst6") 650 and another destination (e.g., "dst7") 655.

TX 420-1/520-1 may be provided independent stream spaces 660 and 665 in fabric 350 to each of RX 430-1/530-1 and RX 430-2/530-2. Each of stream spaces 660 and 665 may use up to one-hundred and twenty-eight (128) streams without interfering with other streams. For example, TX 420-1/520-1 may provide a stream 670 (e.g., for FC packet 605 and data packet 610), via stream space 660, to destination 640 of RX 430-1/530-1. TX 420-1/520-1 may also provide a stream 675 (e.g., for FC packet 615 and data packet 620), via stream space 665, to destination 645 of RX 430-2/530-2. In an exemplary implementation, TX 420-1/520-1 may provide streams 670 and 675 at the same time. FC packet 605 may be multiplexed with data packet 610 (e.g., via stream 670) with a strict priority (i.e., FC packet 605 may be sent before data packet 610). FC packet 615 may be multiplexed with data packet 620 (e.g., via stream 675) with a strict priority (i.e., FC packet 615 may be sent before data packet 620).

TX 420-2/520-2 may be provided a single stream space 680 in fabric 350 to RX 430-3/530-3. Stream space 680 may use up to one-hundred and twenty-eight (128) streams without interfering with other streams. For example, TX 420-2/520-2 may provide a stream 685 (e.g., for FC packet 625 and high priority data packet 630), via stream space 680, to destination 650 of RX 430-3/530-3. TX 420-2/520-2 may also provide a stream 690 (e.g., for low priority data packet 635), via stream space 680, to destination 655 of RX 430-3/530-1. In an exemplary implementation, TX 420-2/520-2 may provide streams 685 and 690 at the same time and streams 685 and 690 may share the same stream space (e.g., stream space 680). FC packet 625 may be multiplexed with high priority data packet 630 (e.g., via stream 685) with a strict priority (i.e., FC packet 625 may be sent before high priority data packet 630). In one example, FC packet 625 may carry stream information for both streams 685 and 690.

Although FIG. 8 shows exemplary components of exemplary portion 800 of network device 110, in other implementations, portion 800 may contain fewer components, different components, differently arranged components, or additional components than depicted in FIG. 8. Alternatively, or additionally, one or more components of portion 800 may perform one or more other tasks described as being performed by one or more other components of portion 800. For example, RXs 430-1, 430-2, and 430-3 (or RXs 530-1, 530-2, and 530-3) may be a single RX 430 (or RX 530) that receives streams from multiple TXs 420/520.

Exemplary Process

FIGS. 9-12 are flow charts of an exemplary process 900 for providing per-stream packet flow control and allocating bandwidth for packets according to implementations described herein. In one implementation, process 900 may be performed by one of network devices 110. In another implementation, some or all of process 900 may be performed by one or more components of one of network devices 110.

Figure 9:
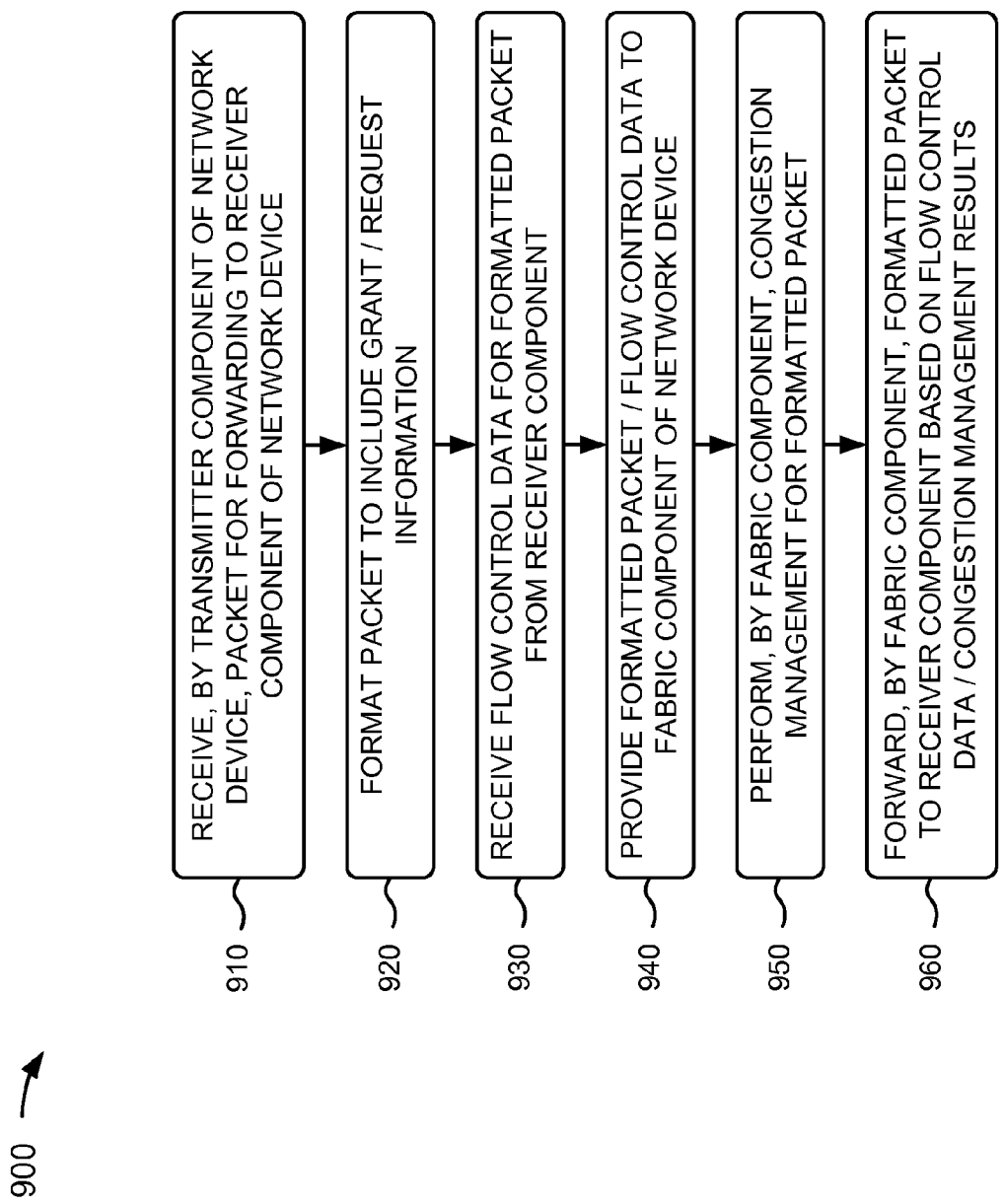
FIGS. 9-12 are flow charts of an exemplary process for providing per-stream packet flow control and allocating bandwidth for packets according to implementations described herein.

As illustrated in FIG. 9, process 900 may include receiving, by a transmitter component of a network device, a packet for forwarding to a receiver component of the network device (block 910), and formatting the packet to include grant and request information (block 920). For example, in implementations described above in connection with FIG. 6, packet formatter 610 of network device 110 may receive packet 460 (e.g., via a physical link), may format packet 460 to produce formatted packet 650, and may provide formatted packet 650 to flow controller 620 (e.g., within input IOC 300). In one example, packet formatter 610 may generate formatted packet 650 in accordance with UPOH protocol 360. In another example, packet formatter 610 may format packet 460 so that requests and grants may be used to handle packet routing between IOCs 300/340 and PFEs 310/330 and so that fabric 350 may manage congestion.

As further shown in FIG. 9, process 900 may include receiving flow control data for the formatted packet from the receiver component (block 930), and providing the formatted packet and the flow control data to a fabric component of the network device (block 940). For example, in implementations described above in connection with FIG. 6, flow controller 620 (e.g., associated with input IOC 300 of network device 110) may receive formatted packet 650 from packet formatter 610, and may receive flow control data 660 from flow controller 620 of input PFE 310. Flow control data 660 may include information that may control the flow of packets (e.g., formatted packet 650) from a source device (e.g., a transmitter component, such as input IOC 300) to a destination device (e.g., a receiver component, such as input PFE 310). Flow controller 620 (e.g., associated with input IOC 300) may provide formatted packet 650 and its associated flow control data 660 to congestion manager 640.

Returning to FIG. 9, process 900 may include performing, by the fabric component, congestion management for the formatted packet (block 950), and forwarding, by the fabric component, the formatted packet to the receiver component based on the flow control data and results of the congestion management (block 960). For example, in implementations described above in connection with FIG. 6, congestion manager 640 of network device 110 may receive formatted packet 650 and flow control data 660 from flow controller 620. Congestion manager 640 may perform congestion management for formatted packet 650 (e.g., based on flow control data 660), and may forward formatted packet 650 to input PFE 310 based on results of the congestion management and/or based on flow control data 660. Input PFE 310 may forward formatted packet 650 (e.g., in accordance with UPOH protocol 360) to another component of network device 110 (e.g., to switching fabric 320).

Figure 10:
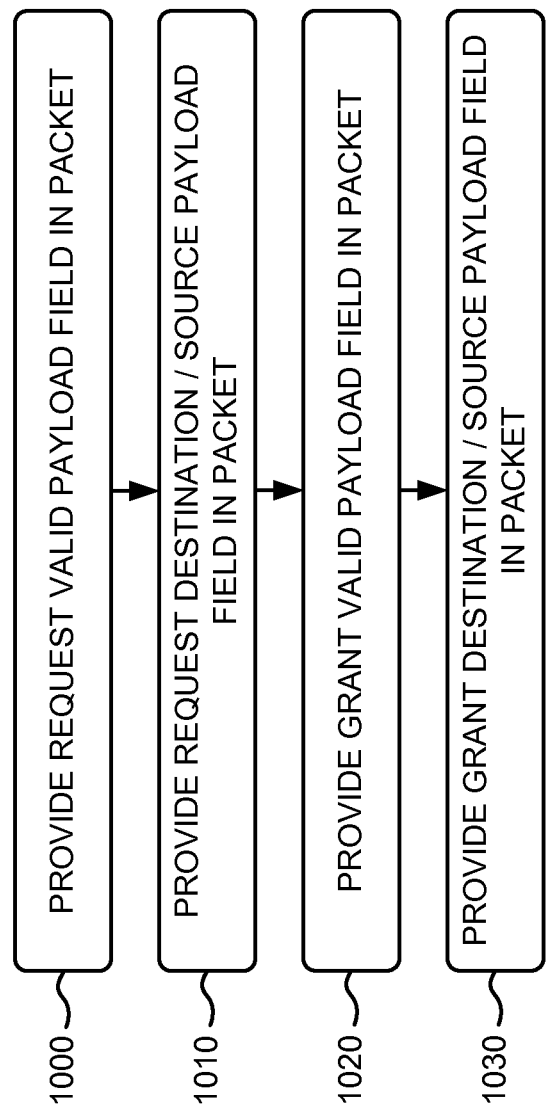

Process block 920 may include the process blocks depicted in FIG. 10. As shown in FIG. 10, process block 920 may include one or more of providing a request valid payload field in the packet (block 1000), providing a request destination/source payload field in the packet (block 1010), providing a grant valid payload field in the packet (block 1020), or providing a grant destination/source payload field in the packet (block 1030). For example, in implementations described above in connection with FIG. 6, packet formatter 610 of network device 110 may format packet 460 to include one or more of the payload fields. In one example, packet formatter 610 may provide a "RequestValid" field (e.g., indicating that a cell contains a valid request) in packet 460; may provide a "RequestDest/Source" field (e.g., providing a destination and a source of a request) in packet 460; may provide a "GrantValid" field (e.g., indicating that a cell contains a valid grant) in packet 460; and may provide a "GrantDest/Source" (e.g., providing a destination and a source of a grant) in packet 460.

Figure 11:
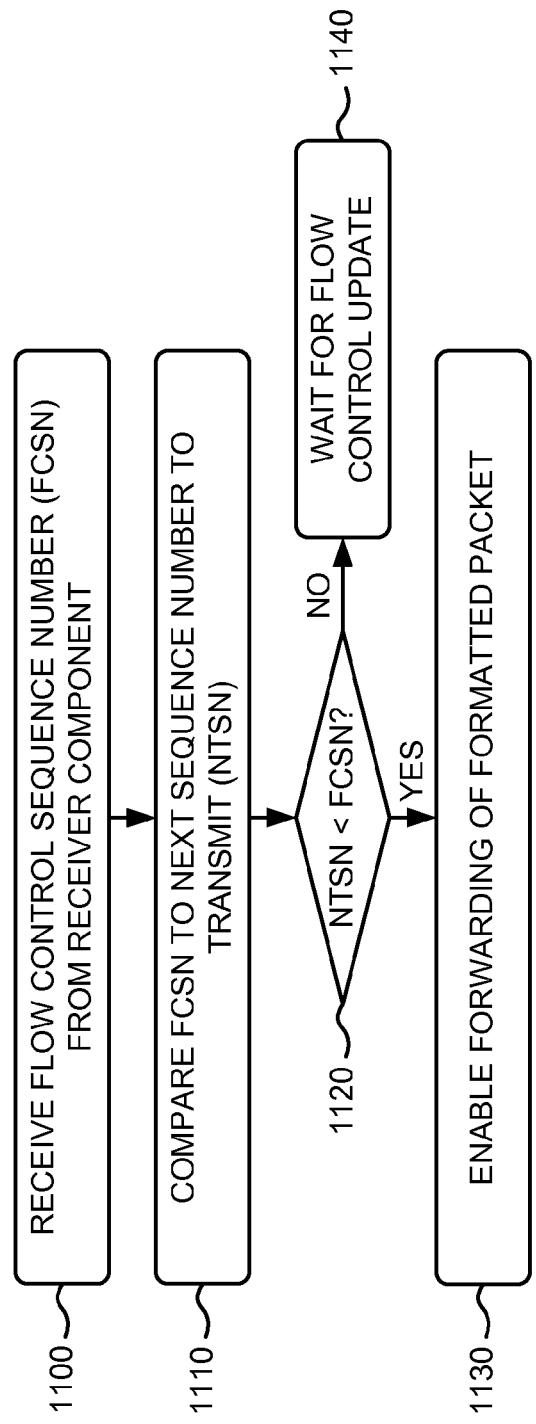

Process block 930 may include the process blocks depicted in FIG. 11. As shown in FIG. 11, process block 930 may include receiving a flow control sequence number (FCSN) from the receiver component (block 1100), and comparing the FCSN to a next sequence number to transmit (NTSN) (block 1110). If the NTSN is less than the FCSN (block 1120—YES), forwarding of the formatted packet may be enabled or prepared (block 1130). If the NTSN is greater than or equal to the FCSN (block 1120—NO), process block 930 may include waiting for a flow control update (block 1140).

For example, in implementations described above in connection with FIG. 6, flow control in UPOH protocol 360 may cause a receiver component (e.g., input PFE 310) to send a per-stream sequence number (e.g., a FCSN) to a transmitter component (e.g., input IOC 300). The FCSN may indicate a last sequence number (e.g., incremented by one) that the transmitter component may be permitted to send. At stream initialization, the transmitter component's copy of the FCSN and a next sequence number to transmit (NTSN) may be initialized to zero. The transmitter component may only send a packet if the NTSN is less than the FCSN. Since zero is equal to zero (e.g., a starting state), the transmitter component may be unable to send a packet until the transmitter component receives a flow control update from the receiver component. In one example, if the NTSN is six (6) and the FCSN is ten (10), the transmitter component may send four cells (e.g., cells 6, 7, 8, and 9) before waiting for a flow control update from the receiver component. NTSN may be incremented after a packet is transmitted.

Figure 12:
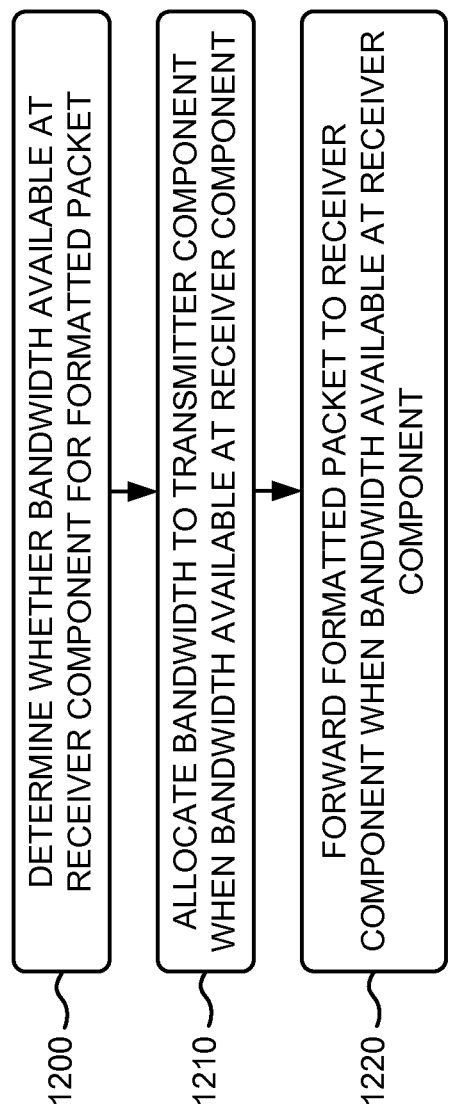

Process blocks 950/960 may include the process blocks depicted in FIG. 12. As shown in FIG. 12, process blocks 950/960 may include determining whether bandwidth is available at the receiver component for receiving the formatted packet (block 1200), allocating bandwidth to the transmitter component when bandwidth is available at the receiver component for receiving the formatted packet (block 1210), and forwarding the formatted packet to the receiver component when bandwidth is available at the receiver component for receiving the formatted packet (block 1220). For example, in implementations described above in connection with FIG. 6, congestion manager 640 of network device 110 may determine whether bandwidth is available at input PFE 310 for forwarding formatted packet 650, and may allocate bandwidth to input IOC 300 when bandwidth is available at input PFE 310. Congestion manager 640 may forward formatted packet 650 to input PFE 310 when bandwidth is available at input PFE 310 for formatted packet 650, and input PFE 310 may forward formatted packet 650 to another destination (e.g., to output PFE 330, via switching fabric 320).

CONCLUSION

Implementations described herein may provide systems and/or methods that enable, via a stream-based packet protocol (e.g., a UPOH protocol), point-to-point connections as well as oversubscribed configurations using a generic cell-based fabric. The systems and/or methods may transfer packets between two devices or components (e.g., a receiver component and transmitter component provided in a network device) on multiple interleaved streams. The systems and/or methods may provide flow control on each stream so that the receiver component may limit a rate at which the transmitter component may send packets. The systems and/or methods may provide cell-based data transfer between the transmitter and receiver components to allow for use of a generic cell-based fabric component (i.e., a protocol-specific component is not required).

Furthermore, the systems and/or methods may allocate bandwidth between endpoints (e.g., multiple transmitter components) that want to communicate with a same target component (e.g., the receiver component). The bandwidth allocation may handle static point-to-point data transfers, dynamic multipoint-to-point (e.g., with congestion management) data transfers, and dynamic point-to-multipoint (e.g., with congestion management) data transfers. The systems and/or methods may also be tolerant of dropped cells by allowing the receiver component to detect and recover from lost cells containing packet data.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 9-12, the order of the blocks may be modified in other implementations. Further, non-dependent blocks may be performed in parallel.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a transmitter component of a network device, a packet for forwarding to a receiver component of the network device;
   receiving, by the transmitter component and from the receiver component, a flow control sequence number (FCSN);
   comparing, by the transmitter component, the FCSN to a next sequence number to transmit (NTSN);
   waiting, by the transmitter component, for a flow control update from the receiver component when the FCSN is greater than or equal to the NTSN;
   enabling, by the transmitter component, the packet to be forwarded when the FCSN is less than the NTSN;
   receiving, by the transmitter component and from the receiver component, flow control data for the packet, the flow control data including the flow control update;
   providing, by the transmitter component, the packet and the flow control data to a fabric component of the network device;
   performing, by the fabric component, a congestion management operation for the packet to obtain results of the congestion management operation; and
   forwarding, by the fabric component, the packet to the receiver component based on the flow control data and the results of the congestion management operation.

2. The method of claim 1, further comprising:
   formatting the packet to include first information regarding a grant and second information regarding a request.

3. The method of claim 2, where formatting the packet further comprises one or more of:
   providing, in the packet, a request valid payload field that indicates that the packet includes the request that is valid;
   providing, in the packet, a request destination/source payload field that indicates a destination and a source of the request;
   providing, in the packet, a grant valid payload field that indicates that the packet includes the grant that is valid; or
   providing, in the packet, a grant destination/source payload field that indicates a destination and a source of the grant.

4. The method of claim 1,
   where the fabric component is associated with multiple fabric priorities, and
   where providing the packet and the flow control data to the fabric component includes:
      providing the flow control data to a fabric with a highest priority of the multiple fabric priorities.

5. The method of claim 1, where performing the congestion management operation further comprises:
   determining, by the fabric component, whether bandwidth is available at the receiver component for receiving the packet; and
   allocating, by the fabric component, the bandwidth to the transmitter component when the bandwidth is available at the receiver component for receiving the packet.

6. The method of claim 5, where forwarding the packet further comprises:
   forwarding, by the fabric component, the packet to the receiver component when the bandwidth is available at the receiver component for receiving the packet.

7. The method of claim 1, where the network device comprises one or more of:
   a gateway,
   a router,
   a switch,
   a firewall,
   a network interface card (NIC),
   a hub,
   a bridge,
   a proxy server, or
   an optical add-drop multiplexer (OADM).

8. A network device comprising:
   a receiver component;
   a fabric component; and
   a transmitter component to:
      receive a packet for forwarding to the receiver component,
      receive a flow control sequence number (FCSN) from the receiver component,
      compare the FCSN to a next sequence number to transmit (NTSN),
      wait for a flow control update from the receiver component when the FCSN is greater than or equal to the NTSN,
      enable the packet to be forwarded when the FCSN is less than the NTSN,
      receive flow control data for the packet from the receiver component,
         the flow control data including information for controlling a flow of the packet from the transmitter component to the receiver component, and provide the packet and the flow control data to the fabric component,
   the fabric component being to:
      perform a congestion management operation for the packet, and
      forward the packet to the receiver component based on the flow control data and results of the congestion management operation.

9. The network device of claim 8, where the transmitter component is further to:
   format the packet in accordance with a protocol used in a type of network associated with the network device.

10. The network device of claim 8, where the transmitter component is further to at least one of:
    format the packet by providing, in the packet, a request valid payload field that indicates that the packet includes a request that is valid,
    format the packet by providing, in the packet, a request destination/source payload field that indicates a destination and a source of the request,
    format the packet by providing, in the packet, a grant valid payload field that indicates that the packet includes a grant that is valid, or
    format the packet by providing, in the packet, a grant destination/source payload field that indicates a destination and a source of the grant.

11. The network device of claim 8, where the transmitter component is further to:
    increment the NTSN after providing the packet to the fabric component.

12. The network device of claim 8, where, when performing the congestion management operation, the fabric component is further to:
    determine whether bandwidth is available at the receiver component for receiving the packet, and
    allocate the bandwidth to the transmitter component when the bandwidth is available at the receiver component for receiving the packet.

13. The network device of claim 12, where, when forwarding the packet, the fabric component is further to:
    forward the packet to the receiver component when the bandwidth is available at the receiver component for receiving the packet.

14. The network device of claim 8, where the network device comprises one or more of:
    a gateway,
    a router,
    a switch,
    a firewall,
    a network interface card (NIC),
    a hub,
    a bridge,
    a proxy server, or
    an optical add-drop multiplexer (OADM).

15. A non-transitory computer-readable storage medium storing instructions, the instructions comprising:
    one or more instructions that, when executed by a network device, cause the network device to:
       receive a packet for forwarding to a receiver component of the network device,
       receive a flow control sequence number (FCSN) from the receiver component,
       compare the flow control sequence number to a next sequence number to transmit (NTSN),
       wait for a flow control update from the receiver component when the FCSN is greater than or equal to the NTSN,
       prepare the packet to be forwarded when the FCSN is less than the NTSN receive, from the receiver component, the flow control update, provide the packet to a fabric component of the network device, perform a congestion management operation for the packet, and forward, from the fabric component and to the receiver component, the packet based on results of the congestion management operation.

16. The non-transitory computer-readable storage medium of claim 15, the instructions further comprising:
one or more instructions that, when executed by the network device, cause the network device to:
format the packet to include first information regarding a grant and second information regarding a request.

17. The non-transitory computer-readable storage medium of claim 15, further comprising:
one or more instructions that, when executed by the network device, cause the network device to:
provide, in the packet, a request valid payload field that indicates that the packet includes a request that is valid,
provide, in the packet, a request destination/source payload field that indicates a destination and a source of the request,
provide, in the packet, a grant valid payload field that indicates that the packet includes a grant that is valid, or
provide, in the packet, a grant destination/source payload field that indicates a destination and a source of the grant.

18. The non-transitory computer-readable storage medium of claim 15,
where the flow control data includes information for controlling a flow of the packet from the transmitter component to the receiver component, and
where the packet includes a type field that indicates how to interpret different parts of the packet.

19. The non-transitory computer-readable storage medium of claim 15, where the one or more instructions to perform the congestion management operation include:
one or more instructions that, when executed by the network device, cause the network device to:
determine whether bandwidth is available at the receiver component for receiving the packet, and
allocate the bandwidth to the transmitter component when the bandwidth is available at the receiver component for receiving the packet.

20. The non-transitory computer-readable storage medium of claim 19, where the one or more instructions to forward the packet include:
one or more instructions that, when executed by the network device, cause the network device to:
forward the packet to the receiver component when the bandwidth is available at the receiver component for receiving the packet.

* * * * *